(12) United States Patent
Kato

(10) Patent No.: US 7,437,467 B2
(45) Date of Patent: Oct. 14, 2008

(54) PRINTING SYSTEM AND METHOD OF SETTING SAME, INFORMATION PROCESSING APPARATUS AND STORAGE MEDIUM

(75) Inventor: Kazunori Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 11/304,605

(22) Filed: Dec. 16, 2005

(65) Prior Publication Data

US 2006/0095500 A1 May 4, 2006

Related U.S. Application Data

(62) Division of application No. 09/981,843, filed on Oct. 19, 2001, now Pat. No. 7,260,637.

(30) Foreign Application Priority Data

Oct. 23, 2000 (JP) ............................. 2000-323041
Oct. 4, 2001 (JP) ............................. 2001-308832

(51) Int. Cl.
*G06F 15/00* (2006.01)
*G06F 15/16* (2006.01)
*G06F 3/00* (2006.01)

(52) U.S. Cl. ..................... 709/227; 358/1.15; 710/19

(58) Field of Classification Search ................. 709/203, 709/201, 219; 358/1.15; 710/19
See application file for complete search history.

(56) References Cited

U.S. PATENT DOCUMENTS

| 5,220,674 | A | * | 6/1993 | Morgan et al. | ............... 709/223 |
| 6,401,150 | B1 | | 6/2002 | Reilly | ......................... 710/104 |
| 6,452,692 | B1 | * | 9/2002 | Yacoub | ..................... 358/1.15 |
| 6,559,965 | B1 | | 5/2003 | Simpson et al. | ............ 358/1.15 |
| 6,687,776 | B2 | | 2/2004 | Reilly | ......................... 710/104 |

FOREIGN PATENT DOCUMENTS

JP    7-248889    9/1995

* cited by examiner

*Primary Examiner*—Larry D Donaghue
(74) *Attorney, Agent, or Firm*—Fitzpatrick, Cella, Harper & Scinto

(57) ABSTRACT

In a printing control apparatus that communicates with an image forming apparatus connected via a network, information used in order to enable utilization of the image forming apparatus is registered. This information indicates a printing-completion notification function possessed by the image forming apparatus. In response to registration of this information, setting information for setting the printing-completion notification destination of the printing-completion notification function to the printing control apparatus is generated in such a manner that notification of completion of printing can be received from the image forming apparatus. Here setting information, which is recognizable by the image forming apparatus, is generated in order to set the printing-completion notification destination to the printing control apparatus.

13 Claims, 14 Drawing Sheets

F I G. 2
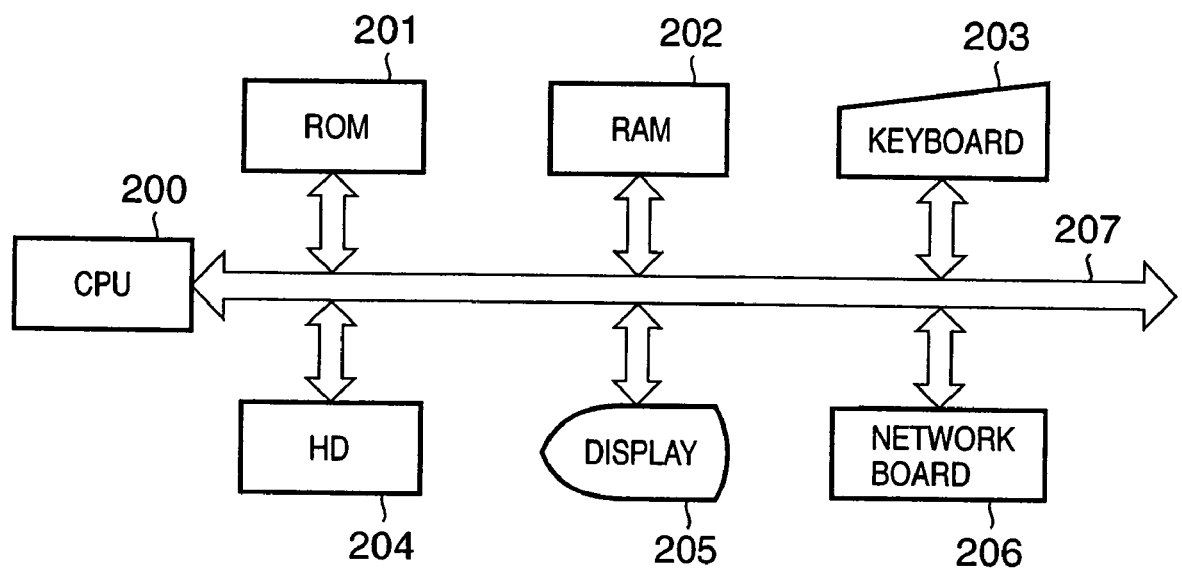

FIG. 11

PJL COMMAND SEQUENCE

<ESC>%-12345X@PJL CJLMODE<CR><LF>
@PJL USTATUS JOB=ON<CR><LF>                          1101
@PJL JOB NAME="AppName00000001"<CR><LF>              1102
.....
@PJL EOJ NAME="AppName00000001"<CR><LF>              1103
<ESC>%-12345X

PRINTING SYSTEM AND METHOD OF SETTING SAME, INFORMATION PROCESSING APPARATUS AND STORAGE MEDIUM

CROSS-REFERENCE TO RELATED APPLICATIONS

This application is a divisional application of U.S. application Ser. No. 09/981,843, filed Oct. 19, 2001, now allowed, the contents of which are incorporated by reference herein.

FIELD OF THE INVENTION

This invention relates to a printing system constructed by an information processing apparatus and a plurality of printers connected on a network, a method of setting the system, the information processing apparatus and a storage medium.

BACKGROUND OF THE INVENTION

In a conventional printing system, a host computer that executes print processing transmits print data to a print server that manages the print job, and the print server (which will be referred to as a "conventional print server" below) transmits the print data to a printer. Conventional print servers usually are provided separately. Problems encountered in the conventional print system are an increase in network load due to the sending and receiving of print data, the burden imposed by installing conventional print servers anew and an increase in the load on conventional print servers.

A printing system set forth below is now being developed in order to solve these problems. For example, a client transmits only job information to a print server and spools print data itself. The print server, on the other hand, retains the job information and manages the sequence of jobs. Further, the print server performs management by monitoring the status of the printer. When it is judged that a printer is capable of accepting print data, the print server so notifies the client. Next, the client so notified by the print server transmits the print data to the printer. As a result, the print data is transmitted directly from the computer that requests printing to the printer without being sent to the print server. This makes it possible to reduce the load on devices and on the network proper. Further, since the load on the print server is reduced, it is unnecessary to newly install a separate print server. In such a print system, however, it is necessary to solve a variety of problems in order to execute print processing appropriately.

The above-mentioned recently developed print server (referred to simply as a "print server" below) that is capable of executing printing sequence processing without spooling print data is required to positively ascertain the status of each printer on the network in order to manage the printing sequence properly. For example, status refers to the state of print processing, which includes the printing-complete status of a printer. In recent years a printer constructing a print system and having a function for notifying of completion of printing has been developed. There are many printers in which the destination to be notified of completion of printing is the source of the print job transmitted to the printer. The destination to be notified of completion of printing by such printers is the host computer that was the source of the transmitted print data. A problem which arises is that the host computer cannot receive such notification of completion of printing. Accordingly, a first goal is to provide an arrangement in which it is possible to receive notification of completion of printing from each printer.

It has become possible in recent years to connect a variety of printers to a printing system. These printers include those having a function for notifying of completion of printing and those not having this function. The print server in recently developed printing systems ascertains the completion of printing of each printer uniformly by polling, even printers having the function for notifying of completion of printing. In accordance with polling, however, printer status is acquired any number of times. A problem that arises, therefore, is increased load upon the network, printers and print servers. Accordingly, a second goal is to provide an arrangement in which it is possible to receive notification of completion of printing reliably irrespective of whether there is notification of end of printing and without subjecting the network and devices to a load on the side of the print server.

Printers having a function for notifying of completion of printing include printers in which the destination of such notification can be registered in advance and printers in which such notification cannot be registered. If print data is transmitted as is to a printer in which the destination of such notification cannot be registered, print data will be generated that includes an instruction to set the source of the transmitted print data as the destination to be notified of completion of printing and it will not be possible for notification of completion of printing to be received reliably on the side of the print server. Accordingly, a third goal is to provide an arrangement in which it is possible to receive notification of completion of printing reliably on the side of the print server in accordance with the print-completion notification function of various printers.

SUMMARY OF THE INVENTION

Accordingly, an on object of the present invention is to solve at least one of the problems set forth above. The object is to appropriately operate a printing system which includes a printer server or a network printer a suitable example of which is an image forming apparatus.

For example, a first object of a preferred embodiment of the present invention is to provide an arrangement in which it is possible to receive notification of completion of printing from each printer.

A second object of a preferred embodiment of the present invention is to provide an arrangement in which it is possible to receive notification of completion of printing reliably irrespective of whether there is notification of end of printing and without subjecting the network and devices to a load on the side of the print server.

A third object of a preferred embodiment of the present invention is to provide an arrangement in which it is possible to receive notification of completion of printing reliably on the side of the print server in accordance with the print-completion notification function of various printers.

A further object of the present invention is to provide a printing system and to a method offsetting the same in which a printer connected to a network is recognized and the printer is set in such a manner that print processing can be executed appropriately on the basis of prescribed information from the recognized printer. In particular, a further object in a preferred embodiment of the present invention is to make it possible to reliably acquire the status of each printer, e.g., notification of completion of printing by each printer, on the side of, the printer server in order to execute printing, sequence management properly.

According to a preferred embodiment of the present invention, the foregoing objects are attained by providing a printing control apparatus that communicates with an image forming apparatus connected via a network, comprising: registration means for registering information used in order to enable utilization of the image forming apparatus; and generating means, responsive to registration of the information by the registration means, for generating setting information to set a printing-completion notification destination of printing-completion notification means of the image forming apparatus in the printing control apparatus in such a manner that notification of completion of printing can be received from the image forming apparatus.

According to a preferred embodiment of the present invention, the foregoing objects are attained by providing a printing control apparatus that communicates with an image forming apparatus connected via a network, comprising: determination means for determining whether the image forming apparatus has a printing-completion notification function; and management means for managing status of print processing by receiving notification of completion of printing, which is transmitted by the image forming apparatus, if the determination means has determined that the image forming apparatus has the printing-completion notification function, and by requesting and receiving status of print processing from the image forming apparatus if the determination means has determined that the image forming apparatus does not have the printing-completion notification function.

According to a preferred embodiment of the present invention, the foregoing objects are attained by providing an image processing apparatus for communicating with a printing control apparatus via a network and transmitting print data to an image forming apparatus, comprising: acquisition means for acquiring device information of the image forming apparatus; and instruction add-on/revision means for adding on or revising, on the basis of the device information, an instruction for setting a printing-completion notification destination of print data in the image forming apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram illustrating the structure of a host computer shown in FIG. 1;

FIG. 11 shows an example of a control instruction, which is embedded by the processing of FIG. 9, embedded in print data in the host computer;

DESCRIPTION OF THE PREFERRED EMBODIMENT

A preferred embodiment of the present invention will now be described in detail with reference to the drawings.

This embodiment relates to a printing system in which an information processing apparatus serving as an ideal example of a host computer, a printing control apparatus serving as an ideal example of a print server and a plurality of image forming apparatus serving as ideal examples of network printers (referred to simply as "printers" below) are connected on a network. A case will be described in which a usable printer is searched for on the network, information such as a network address necessary for use of the printer is acquired and the printer is set automatically.

Figure 1:
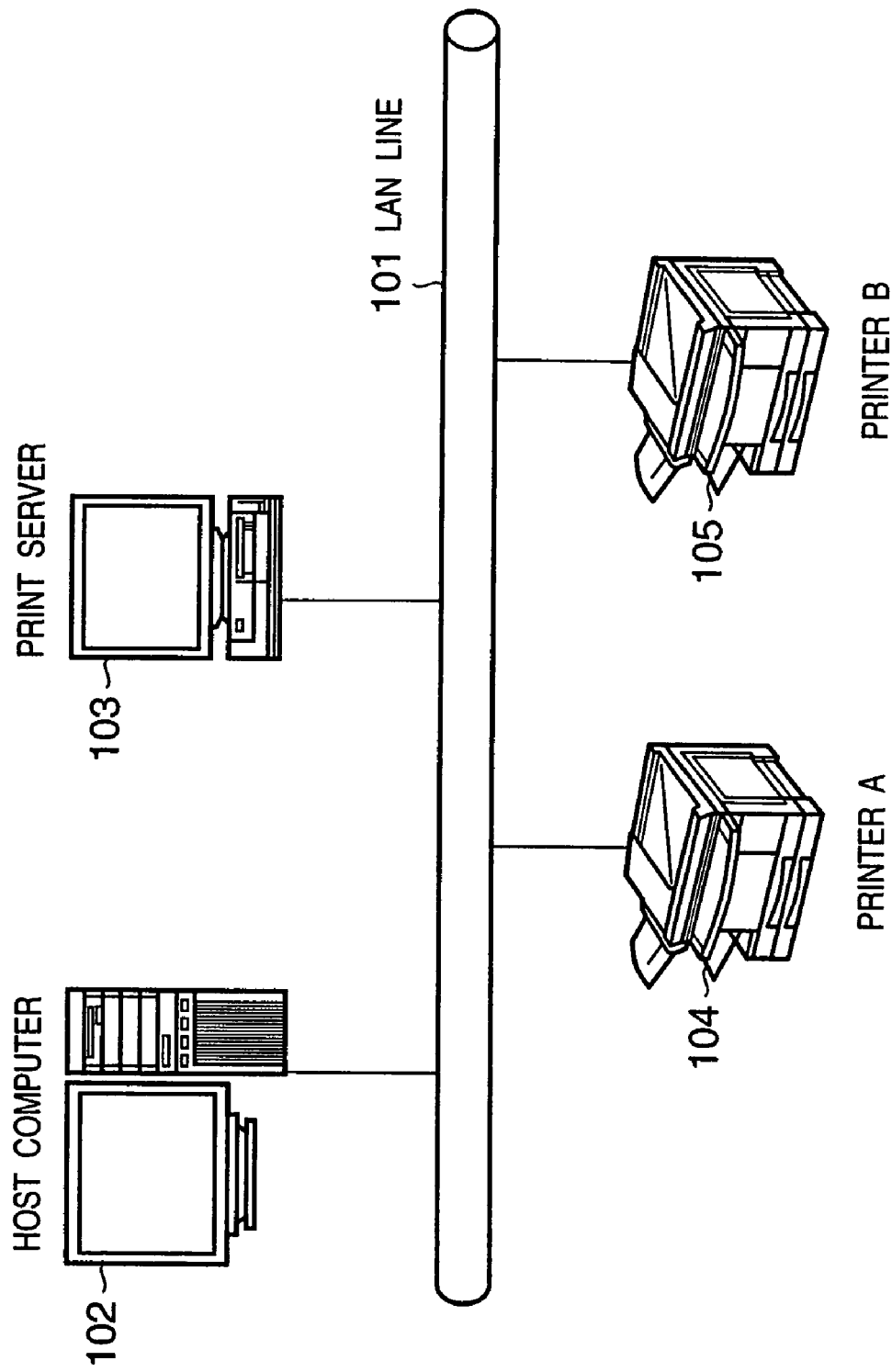
FIG. 1 is a diagram showing the configuration of a printing system according to a preferred embodiment of the present invention.

FIG. 1 is a diagram showing the configuration of a printing system according to a preferred embodiment of the present invention. The system includes a network 101, i.e., the line of a local area network (LAN) such as Ethernet, and a host computer (information processing apparatus) 102 to which a printer (information forming apparatus), described later, has been communicably connected by a predetermined protocol via the network 101. If the image forming apparatus is a printing apparatus capable of receiving print data via the network and of printing the data, then the apparatus may be a copier or a multifunction apparatus having a facsimile function or the like. A printer server 103 manages the printing sequence printer-by-printer on the basis of print requests from a plurality of host computers (clients) connected on the network 101. Printers 104, 105 form images on printing paper in accordance with print data from the plurality of host computers (clients). In order for the printer server 103 that executes printing sequence processing to appropriately ascertain the status of print processing of a print job at each printer, it is necessary to configure the printing system in such a manner that notification of completion of printing can be received reliably on the side of the printer server 103. Another problem is that the user must manually set the network board or printer server of each printer. Another difficulty is that these settings are complicated and require a system administrator who is familiar with the specifications of the network and printing protocol. One goal of this embodiment is to eliminate these difficulties as well.

FIG. 2 is a diagram illustrating the structure of the host computer shown in FIG. 1. The host computer has a CPU 200 which, on the basis of an operating system, executes a prescribed program stored in a ROM 201 (described below) or an application program stored on a hard disk 204, and controls access to various devices connected to a bus, described later. The ROM 201 is a memory in which a control program executed by the CPU 200 and control data, etc., are stored. A RAM 202 is utilized as a working memory when the CPU 200 runs a program stored in the ROM 201 or on the hard disk 204. A keyboard 203, together with a pointing device such as a mouse (not shown), provides means for interfacing the user. The hard disk 204 is a large-capacity storage device in which application programs and the like are stored. A display 205 such as a CRT or LCD functions as a user interface together with the keyboard 203. A network board 206 has a function for communicating with the printers 104, 105 and printer server 103 shown in FIG. 2 or with other client machines in accordance with a plurality of protocols. The devices from CPU 200 to network board 206 are connected to a system bus 207 so constructed that these devices can exchanged data with one another. It should be noted that the computer used in the printer server serving as an example of a printing control apparatus in the present invention has the same hardware configuration as the host computer and need not be described.

Described next will be the flow of print data, printer information and control instruction in a printing system in which a host computer, a plurality of printers and a print server for managing these are connected via a LAN line.

Figure 3:
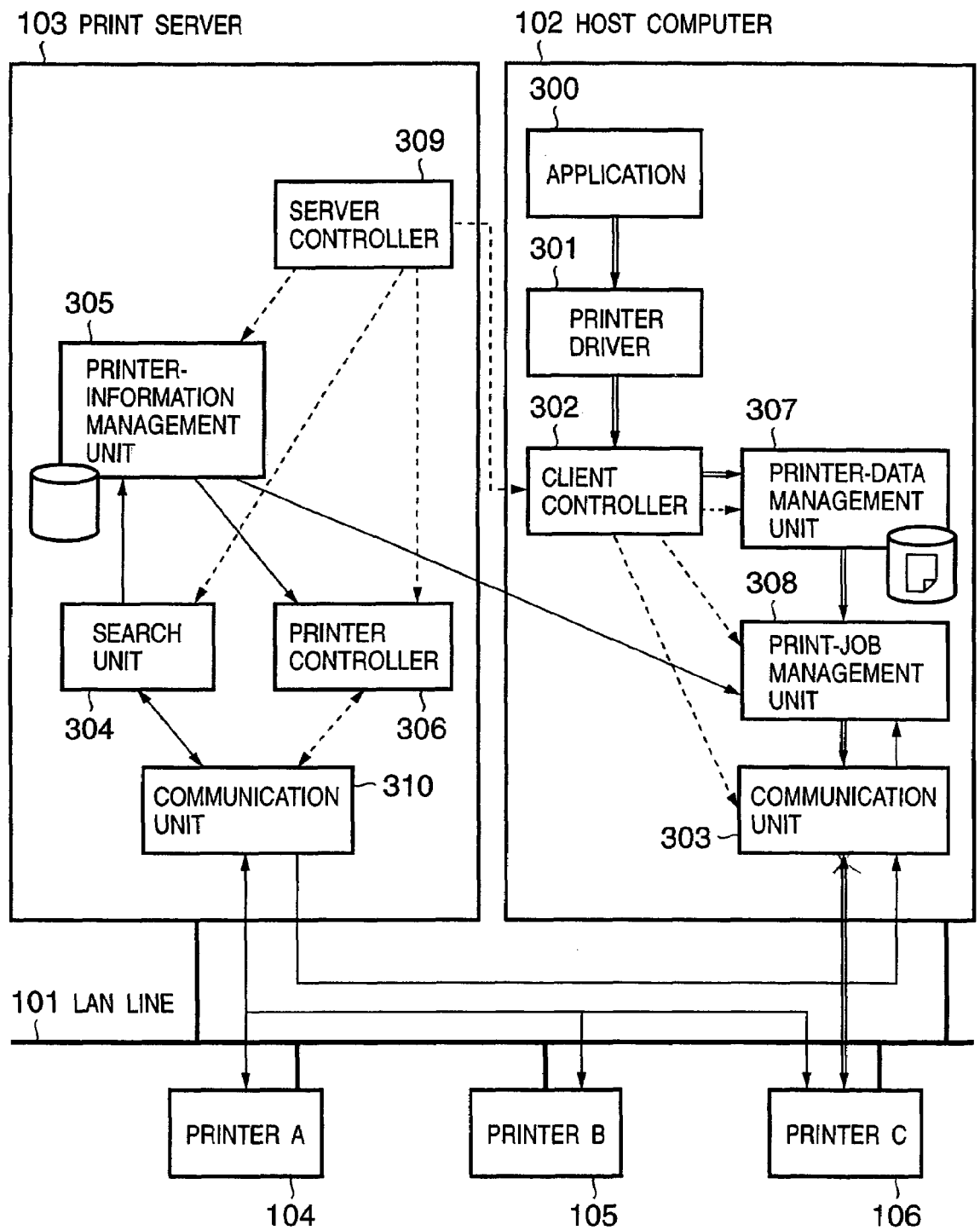
FIG. 3 is a diagram illustrating the flow of data and control in the host computer shown in FIG. 1.

FIG. 3 is a diagram illustrating the flow of data and control in the host computer shown in FIG. 1. An application 300 in FIG. 3 provides the user with a printing function. Modules 301, 302, 303, 307, 308 are provided within the host computer 102, and modules 304, 305, 306, 309, 310 are provided within the print server 103. These modules are implemented by the CPU 200 provided in each machine (printer server and host computer). The modules of the host computer 102 and the modules of the printer server 103 are capable of communicating via communication units 303, 310. The arrangement shown in FIG. 3 is an example of a preferred embodiment.

A printer driver 301 accepts data, which includes a print request and a drawing function, from an application 300 and generates print data capable of being interpreted by a printer serving as an example of an image forming apparatus according to the invention. The image forming apparatus includes a printer as a matter of course as well as a copier, a facsimile machine and a device that combines these functions. The host computer 102 includes a client controller 302. When notification of a print request is made via the printer driver 301, the client controller 302 receives print data from the printer driver 301, transfers the print data to a print-job management unit 308 and, at the same time, registers a print job in a server controller 309. The registration of a print job is implemented by transferring job information that does not include print data from the client controller 302 to the server controller 309. By way of example, job information includes the owner name of a print job, print time, size of print data and printer name of the printer that is the destination of printing. Data size is several kilobytes. Further, the client controller 302 also controls other modules in the host computer that function as part of the printing system. The communication units 303, 310 transfer print data and print control instruction via the LAN line 101 and receive structure and status information, etc., from the printers.

The server controller 309 controls other modules in the printer server and controls the host computer. It also performs the scheduling of print jobs. If job information is registered from the client controller 302, the server controller 309 adds this to a print queue, acquires the status of printers (104 to 106) via the communication unit 310 and sends a print start instruction to the print-job management unit 308 if it is judged that a printer that is the destination of an output is capable of producing an output.

In order to search for a plurality of printers connected to the LAN line 101, a search unit 304 transfers an instruction requesting configuration information to the printers via the communication unit 310 and creates printer configuration information based upon replies from the printers in response to the instruction. The printer configuration information is an example of information that indicates a print-completion notification function possessed by a printer. Information indicating a print-completion notification function includes printer model name, model number and serial number, the type of network board mounted in the printer, the type of chip mounted on the network board, MAC address and IP address, which are examples of network addresses, and the corresponding network protocol. The information indicating a print-completion notification function further includes information relating to software for device control, e.g., whether SNMP is supported or whether a prescribed network printing protocol is supported. This information indicates whether a printer is capable of notifying of completion of printing. The print-completion notification function includes information indicating whether a printer has the printing-completion notification function or information indicating whether a printer is internally provided with a memory for storing the destination to be notified of completion of printing. A printer-information management unit 305 is an ideal example of storage means for storing information indicating the printing-completion notification function possessed by a printer. This unit stores and manages printer configuration information retrieved by the search unit 304. Printer configuration information is an example of information indicating the printing-completion notification function possessed by a printer. The printer-information management unit 305 provides other modules with printer configuration information in response to a request. A printer controller 306 transfers a control instruction for instructing a printer to perform an operation. The printer controller 306 (management means for managing print processing status), which is a preferred example of generating means, generates and transmits a control instruction to instruct a printer to report its status, such as the status of print processing, and makes a setting in such a manner that notification of status may be received from a printer. Alternatively, the printer controller 306 monitors printer status by periodically acquiring printer status. The control instruction for setting a printer so as to communicate its status is an example of printer setting information. Further, the print server acquires printer configuration information, which is an example of information indicating the printing-completion notification function possessed by a printer, from the printer-information management unit 305, and decides the type of control instruction, which is issued to a printer, on the basis of this information.

A print-data management unit 307 retains and manages print data transferred from the client controller 302 in response to a print request from the application 300. Upon receiving a print start instruction from the server controller 309, the print-job management unit 308 acquires print data from the print-data management unit 307 and transfers the data to a printer via the communication unit 303. The print-job management unit 308 adds a printer control instruction onto print data or revises a printer control instruction within print data as necessary. In this case, the print-job management unit 308 (instruction add-on/revision means) acquires printer configuration information from the printer-information management unit 305 and decides the type of printer control instruction to be added on or revised.

Upon acquiring a signal indicating end of printing from the printer controller 306, the server controller 309 notifies the client controller 302 of end of printing of the print job. Upon receiving notification of end of printing from the server controller 309, the client controller 302 issues a print-data delete instruction to the print-job management unit 308 and print-data management unit 307. When deletion of print data ends, the client controller 302 notifies the server controller 309 of the end of print-data deletion. Upon receiving notification of end of print-data deletion from the client controller 302, the server controller 309 deletes the job information to be deleted. This job information is being managed by the printer-information management unit 305.

Figure 14:
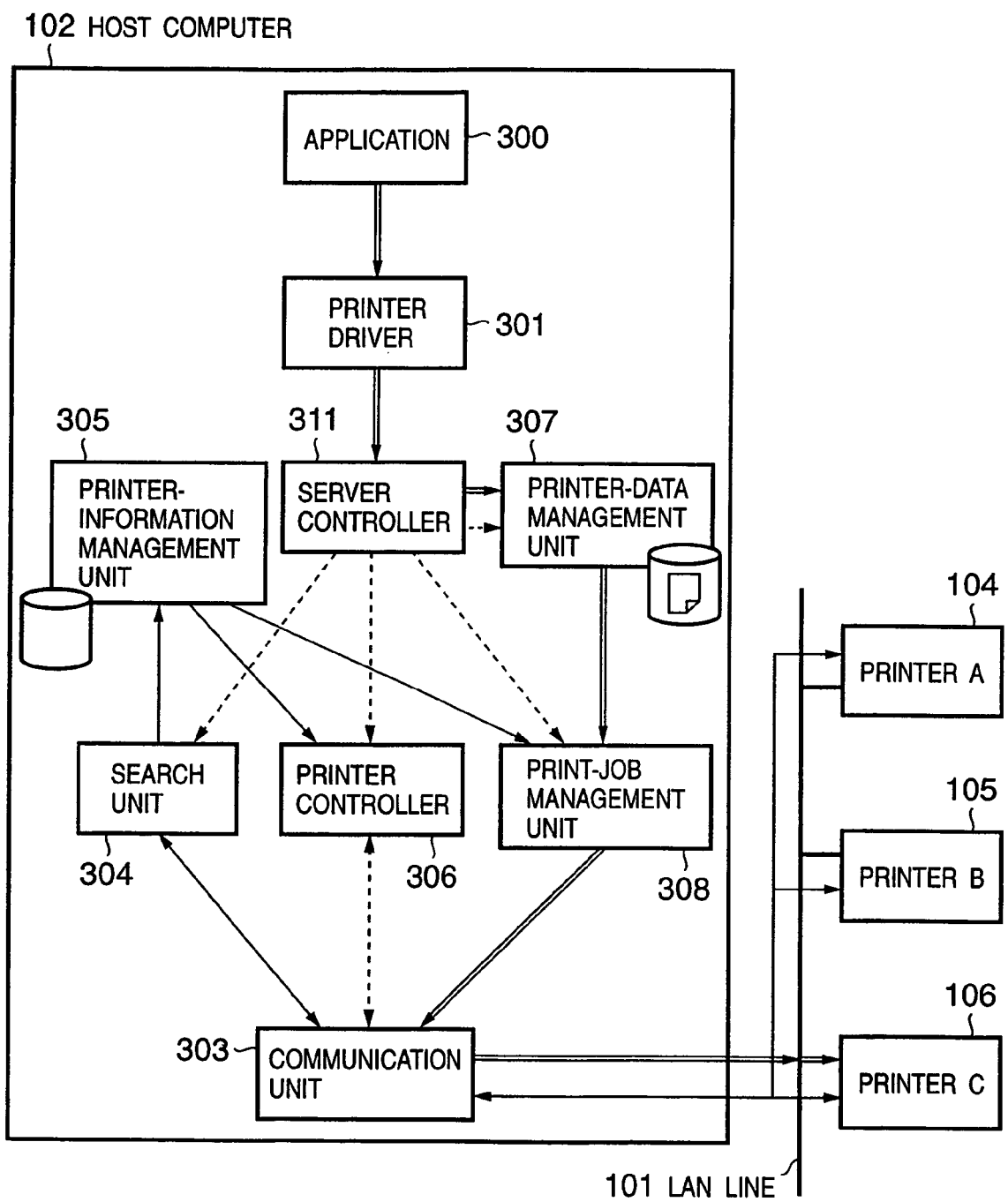
FIG. 14 is a diagram showing an example of a modification of FIG. 3 in which the same computer serves as the platform of a host computer and print server.

FIG. 14 is a diagram showing an example of a modification of FIG. 3 in which the same computer serves as the platform of a host computer and print server. As shown in FIG. 14, the same computer may serve as the platform of the host computer 102 and printer server 103. This modification differs from the arrangement of FIG. 3 as follows: A host computer equipped with the application 300 that requests printing and the print server having the printer controller, etc., are integrated. A controller 311 unites the functions of the server controller and client controller and controls the search unit 304, the printer controller 306, the print-data management unit 307 and the print-job management unit 308. Thus, the processing by the printer controller itself is merely management of the printing sequence, and the spooling of print data is performed by the client. This means that a special print server need not be provided; the print server can be replaced by an ordinary host computer.

By thus performing print job scheduling, printer retrieval, printer information management and printer control in unified fashion by a print server, the printing sequence can be controlled in a printing system having a number of host computers. Further, since print data can be transmitted directly from a host computer to a printer without the intervention of a print server, network traffic is reduced.

Processing in which a plurality of usable printers on a network are set automatically in the printing system constructed as set forth above will now be described.

Figure 4:
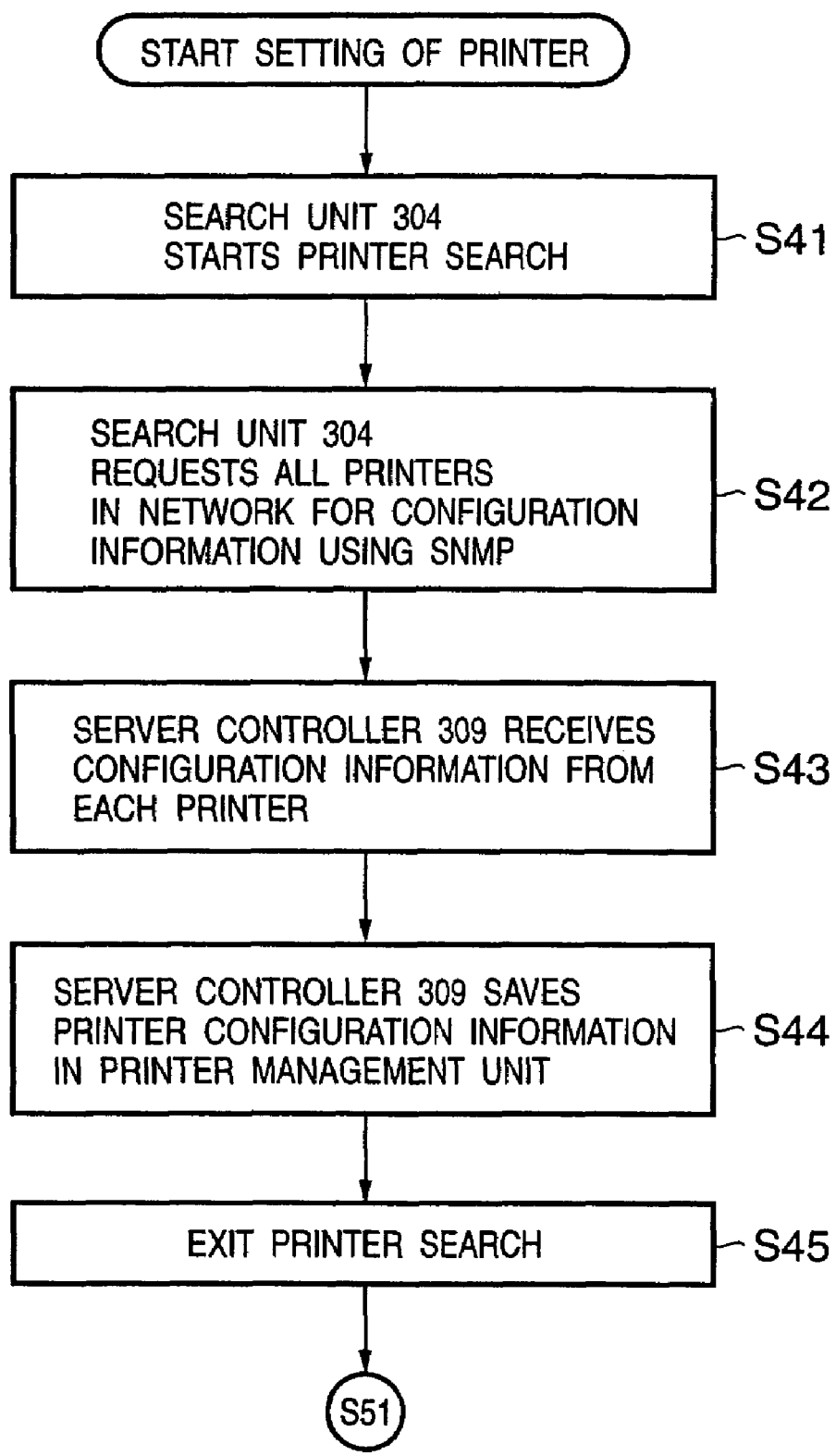
FIG. 4 is a flowchart illustrating print-information acquisition processing in a print server shown in FIG. 1.

FIG. 4 is a flowchart illustrating print-information acquisition processing in the print server shown in FIG. 1.

First, at step S41 in FIG. 4, the controller 309 issues a printer search request to the search unit 304 to start a search of all printers connected to the LAN line 101 (network). This is followed by step S42, at which the search unit 304 requests all printers connected to the LAN line 101 for configuration information via the communication unit 310. More specifically, using the SNMP (Simple Network Management Protocol), which is a protocol for network management used in an TCP/IP network, the search unit 304 specifies an MIB (Management Information Base) number with respect to the network interface board mounted in a printer and requests configuration information such as the network address, model name and name of the network interface board retained in association with the MIB number.

Next, at step S43, the controller 309 receives responses to the requests that were issued to the printers. Since there is a difference in the response times of the printers, the controller 309 waits for printer responses for a pre-set period of time. Next, at step S44, the controller 309 saves the printer configuration information, which was collected from the printer responses at step S43, in the printer-information management unit 305. Printer search processing is exited at step S45.

Figure 5:
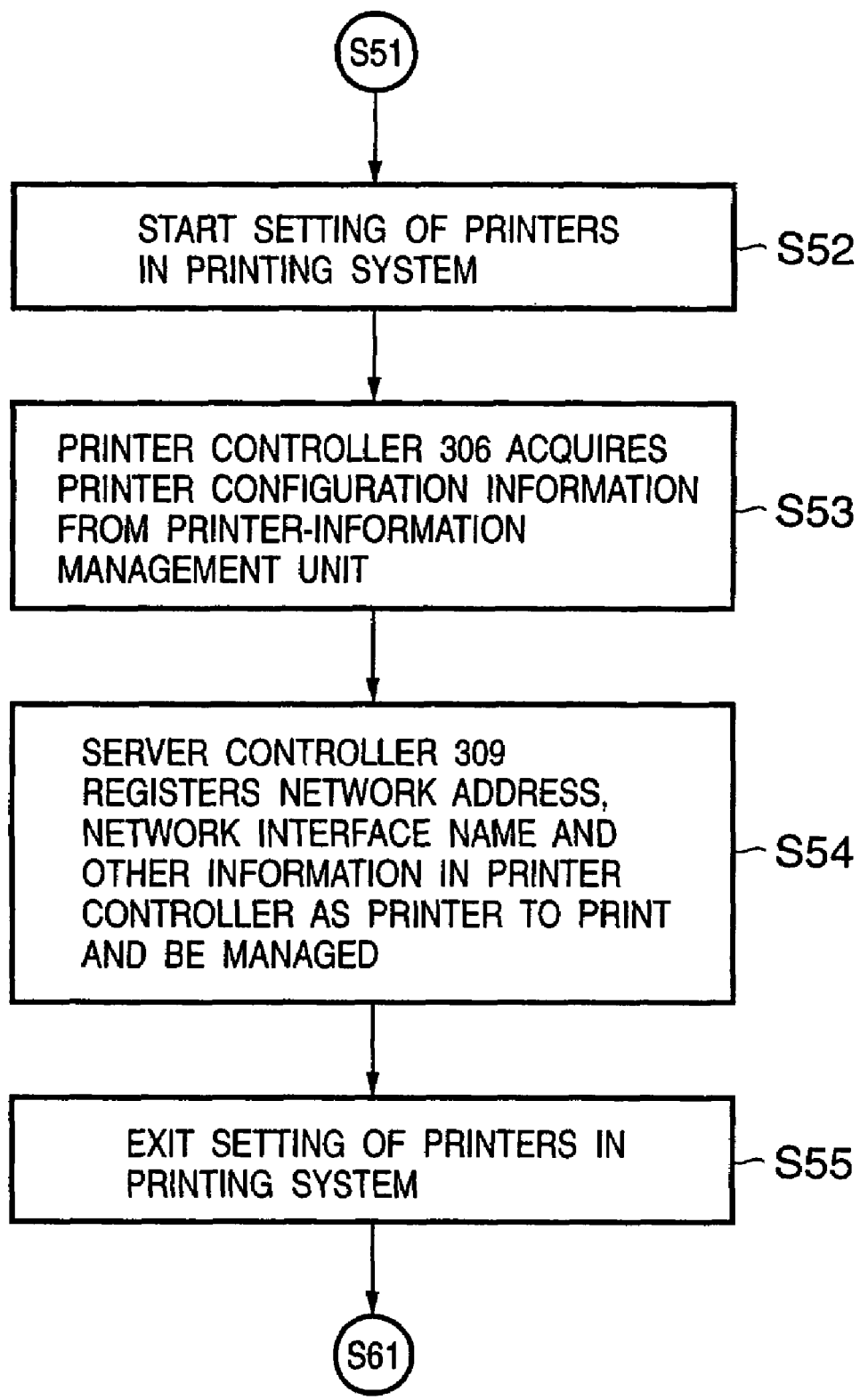
FIG. 5 is a flowchart illustrating printer registration processing using printer configuration information acquired in FIG. 4.

FIG. 5 is a flowchart illustrating printer registration processing using the printer configuration information acquired in FIG. 4. Processing proceeds from S51 in FIG. 4 to S52 in FIG. 5. The setting of printers in the print server is started at step S52 in FIG. 5. First, at step S53, the printer controller 306 acquires, from the printer-information management unit 305, the printer configuration information saved at step S44. Next, at step S54, a printer found by the printer search is registered in the printer server by the server controller 309 as a printer that is the destination of printing and that is the object of management. Next, as information used in order to enable utilization of the printer, information such as the network address of the printer, the type of network interface of the printer, the printer model name, the printer driver name, a location at which the printer driver can be installed and printer information stored in a registry of the operating system is registered as printer configuration information in the printer controller 306, which is a preferred example of registration means. The setting of the printer in the print server is ended at step S55.

With regard to the setting of printers as described above, it is also possible to adopt an arrangement in which a printer among the retrieved printers that has been allowed for use is set automatically user by user or group by group, in which a group includes a plurality of users.

As a result of the foregoing, the printer controller 306 creates a control instruction for each printer on the basis of the set information and transmits the instruction via the communication unit 310 (management-result notification means) in order to execute printer status monitoring and management and tracking of print jobs. Steps S62 and S69 in FIG. 6 correspond to this processing. It is preferred that processing for generating or transmitting a control instruction to printers at steps S62 to S69 be executed in response to processing (S54) for registering, in the printer controller 306, the information that enables utilization of a printer. For example, information that enables utilization of a printer includes printer information of a registry and the network address of the printer. Registration of a printer driver also is conceivable as one example. In order that the printer server can receive notification of completion of printing appropriately, the print server generates a control instruction for setting the network address of the printer server in the printer as the destination of notification of completion of printing in response to registration of this network address in the printer controller 306.

Figure 6:
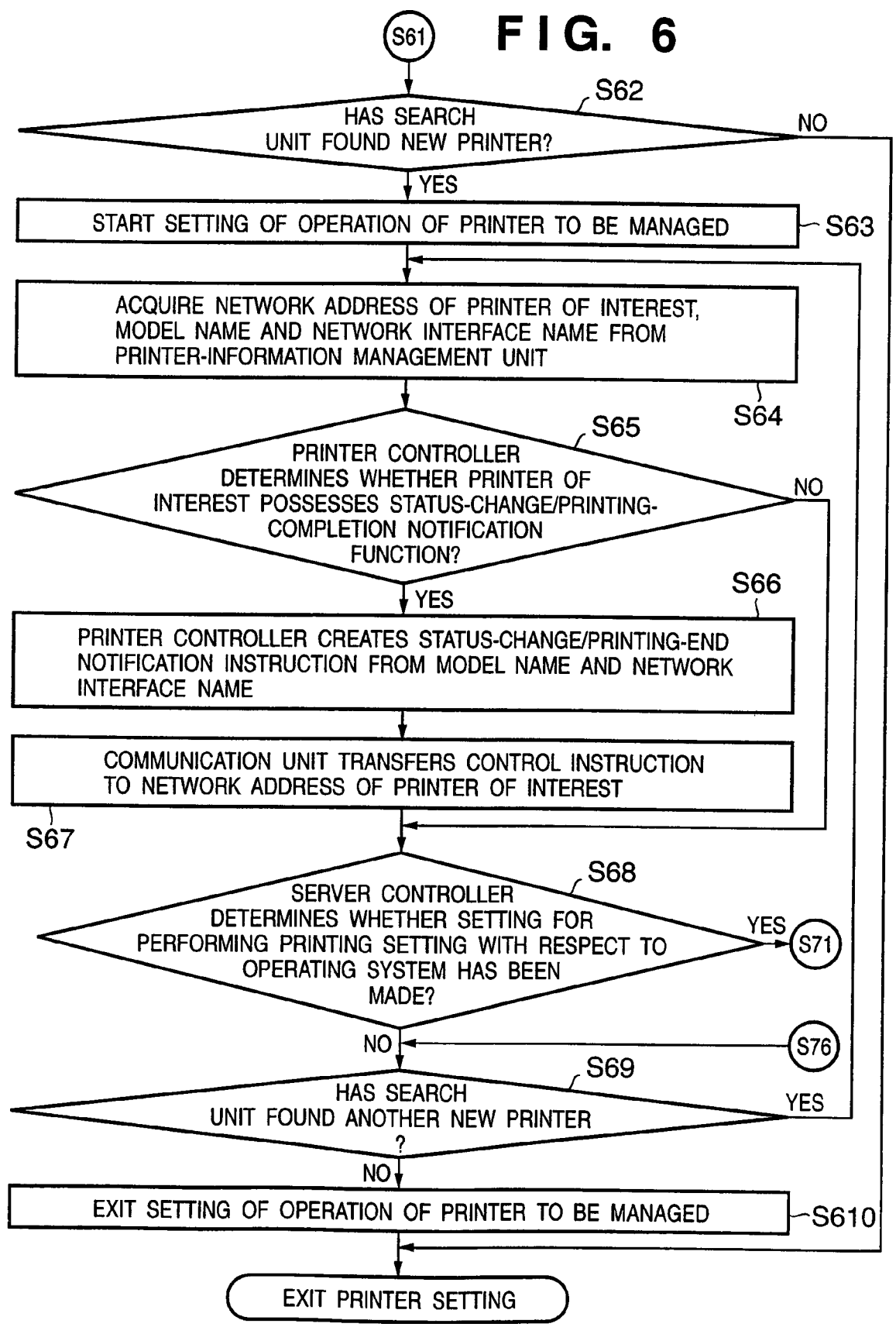
FIG. 6 is a flowchart of processing for setting a printer discovered anew by the processing of FIG. 5.

FIG. 6 is a flowchart of processing for setting a printer discovered anew by the processing of FIG. 5. First, at step S62, it is determined whether a newly discovered printer exists. If such a printer does not exist, processing is exited directly. If the printer does exist, control proceeds to step S63 to start the setting of operation of the newly discovered printer to undergo management. This is followed by step S64, at which the server controller 309 (printing-completion notification function decision means) acquires, from the printer-information management unit 305, configuration information relating to the newly discovered printer whose operation is to be set. Then, at step S65, the printer controller 309 determines whether the newly found printer possesses a status-change/printing-completion notification function. Here the server controller 309 determines, on the basis of the printer model and type of network interface, etc., whether the printer possesses the printing-completion notification function or status notification function.

If the printer of interest does not possess the function mentioned above, then control proceeds to step S68. If it does possess this function, control proceeds to step S66, where the printer controller 306 creates setting information, namely an instruction that instructs the printer to notify of a status change or end of printing. The setting information is created in the format of a control instruction, which is capable of being recognized by the printer of interest, based upon the printer configuration information possessed by the print server, e.g., printer model and type of network interface. At this time the present system is designated as the destination of notification. For example, in response to entry of the network address of the print server, the latter is capable of specifying the printer that requires to be set by retrieving the printer configuration information, recognizing automatically which network protocol is to be used from the format of the entered network address, generating a control instruction that sets the network address of the print server as the destination to be notified of completion of printing by the printer, and transmitting this instruction.

By way of example, an IP address and MAC address can be used as a network address assigned to this system as a destination of notification, or use can be made of a Unified Resource Identifier (URL) or object name or the like definable by a prescribed network printing protocol such as the Internet Printing Protocol. Such information for setting the destination of notification can be constituted by XML and may be sent and received. Using XML is ideal because it enhances the versatility of the setting information. Next, at step S67, the printer control instruction thus created is transferred upon designating the network address of the printer of interest, and the destination to be notified of completion of printing is set in the printer or in the network board of the printer. This is followed by step S68, at which the server controller determines whether a print server for performing a printing setting with respect to the operating system has been set. If the print server has been set, control proceeds to step S72 in FIG. 7 (described later) to perform a printer/printing setting with respect to the operating system. If the print server has not been set, however, control proceeds to step S69, at which it is determined whether another printer for which operation has not been set exists. If it is found that another such printer does exist, control returns to step S64, at which the above-described operation setting is repeated. If the printer does not exist, control proceeds to step S610, at which the setting of printer operation is terminated.

Figure 7:
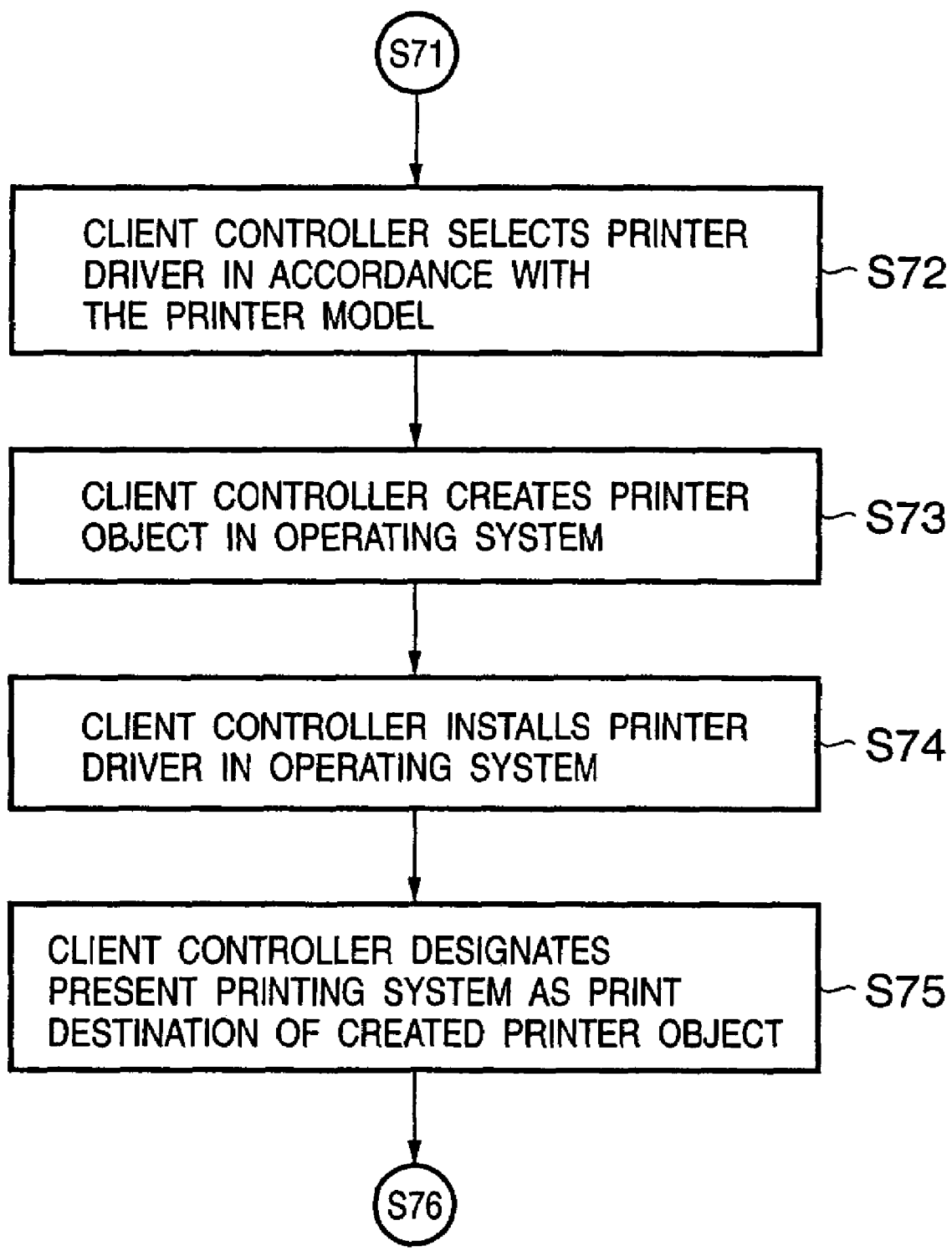
FIG. 7 is a flowchart of processing for setting a print server in a case where an operating system is set for carrying out setting of printing.

FIG. 7 is a flowchart of processing for setting a print server in a case where an operating system is set for carrying out setting of printing. If it is found at step S68 that a setting has been made to perform a printing setting with respect to the operating system in the host computer, then control proceeds to step S72, at which the printer driver to be installed is decided from the model name of the printer. A printer object that will be the print destination of the application is created in the operating system of the host computer at step S73. The application 300 performs printing with respect to the printer object thus created. Next, at step S74, the client controller installs the printer driver selected at step S72 and, at step S75, designates the present print server as the print destination of the print data that the operating system has received from the application.

Thus, setting for print processing and printer management processing by the printer server and setting of the operating system so that an application may perform printing can be performed automatically by the series of processing steps shown in FIGS. 4 to 7 described above. This makes it possible to reliably receive notification of completion of printing on the side of the print server. An instruction that instructs a printer to notify of a change of status or end of printing is created in the format of a control instruction, which is recognizable by the printer of interest, based upon the printer model and type of network interface, and the present system is specified as the destination to be notified. It is unnecessary for the user to manually set the network board of each printer and the printer servers, and the setting of the printing system can be automated. Printing settings are simplified and there is diminished need for a system administrator accustomed to the specifications of the network and printing protocols.

Next, processing for performing printing from the application 300 based upon the printer configuration information acquired from the print search processing set forth above will be described.

Figure 8:
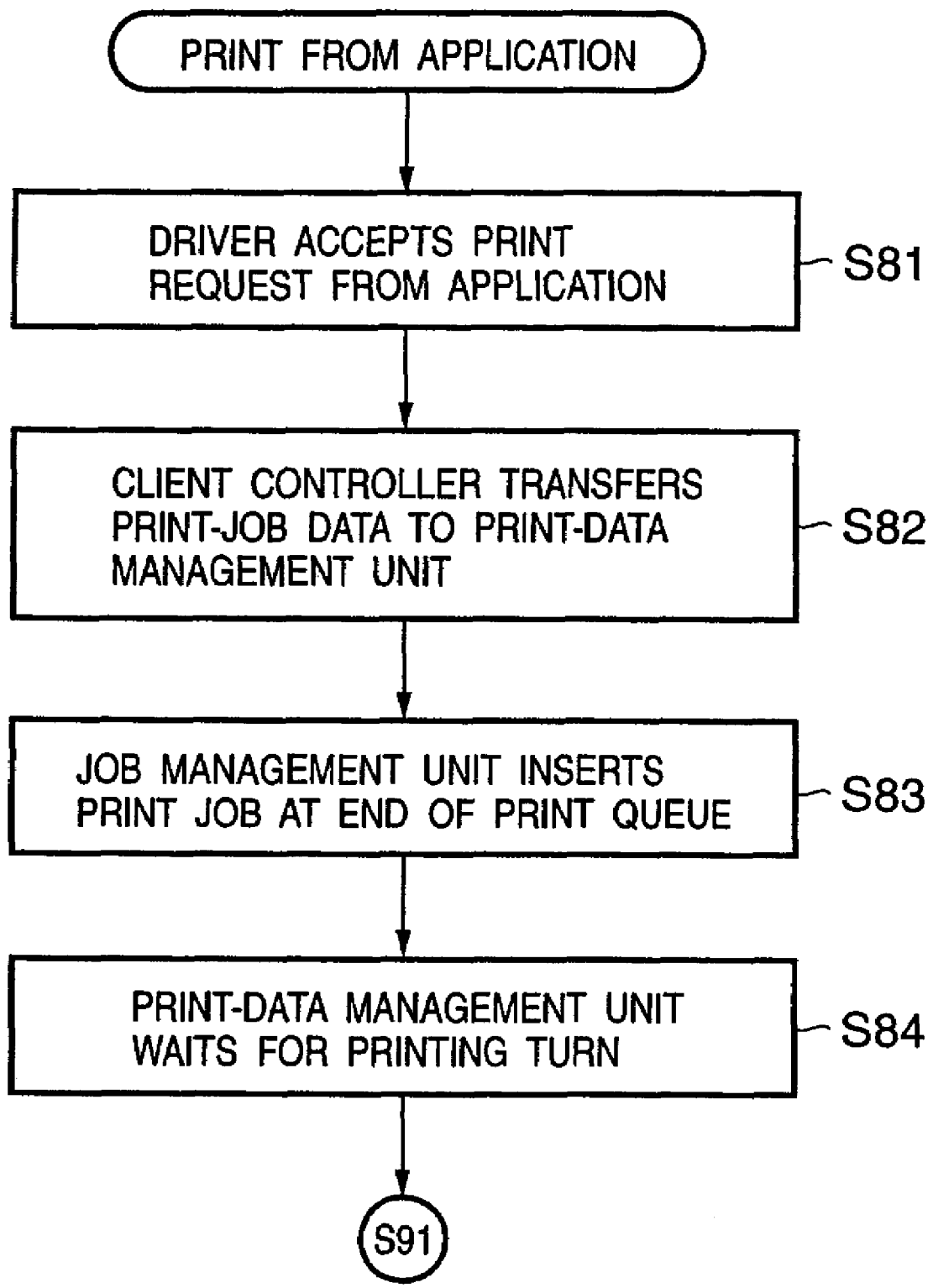
FIG. 8 is a flowchart illustrating processing for printing from an application in the host computer shown in FIG. 1.
Figure 9:
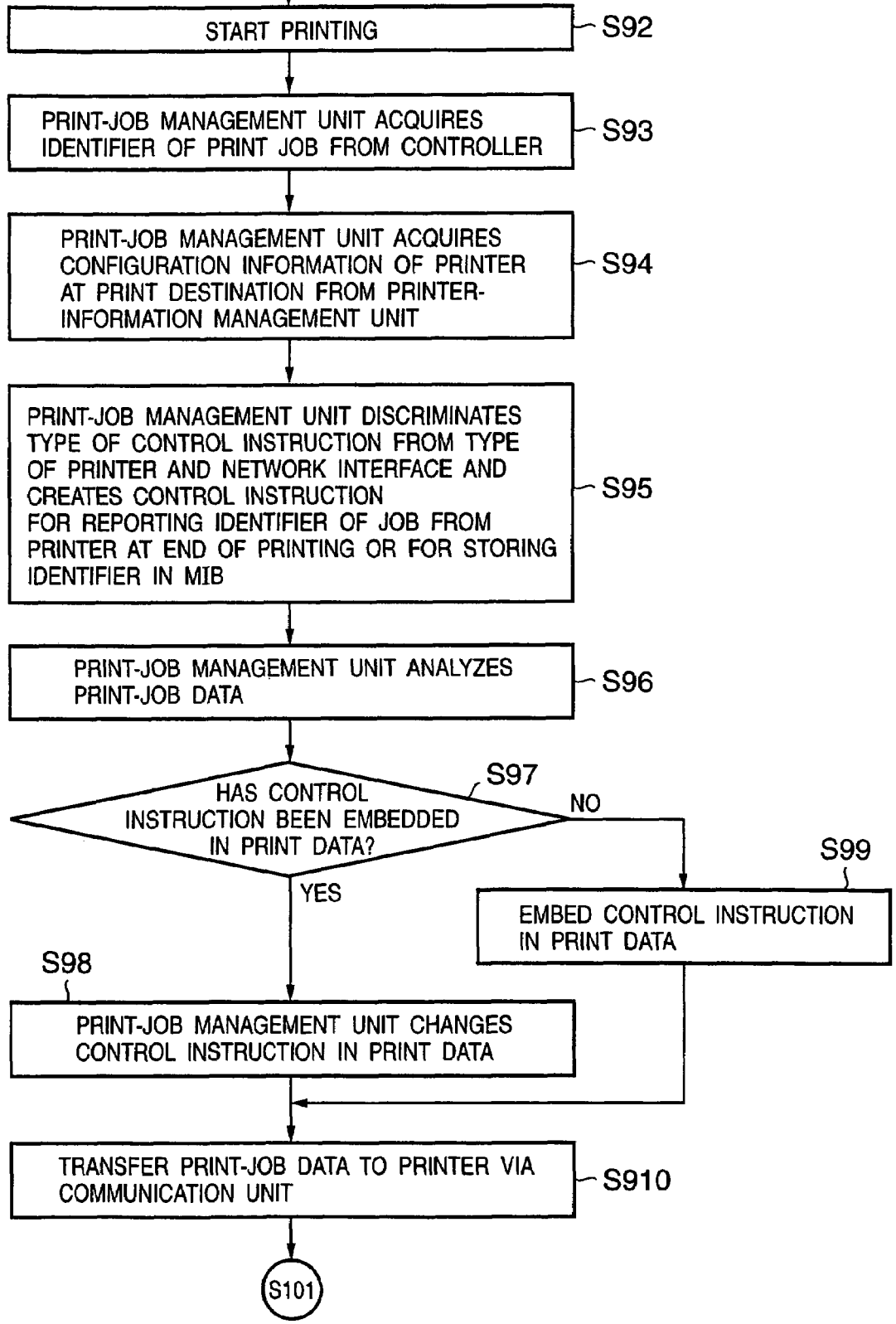
FIG. 9 is a flowchart illustrating processing, which follows that of FIG. 8, for printing from an application in the host computer of FIG. 1.
Figure 10:
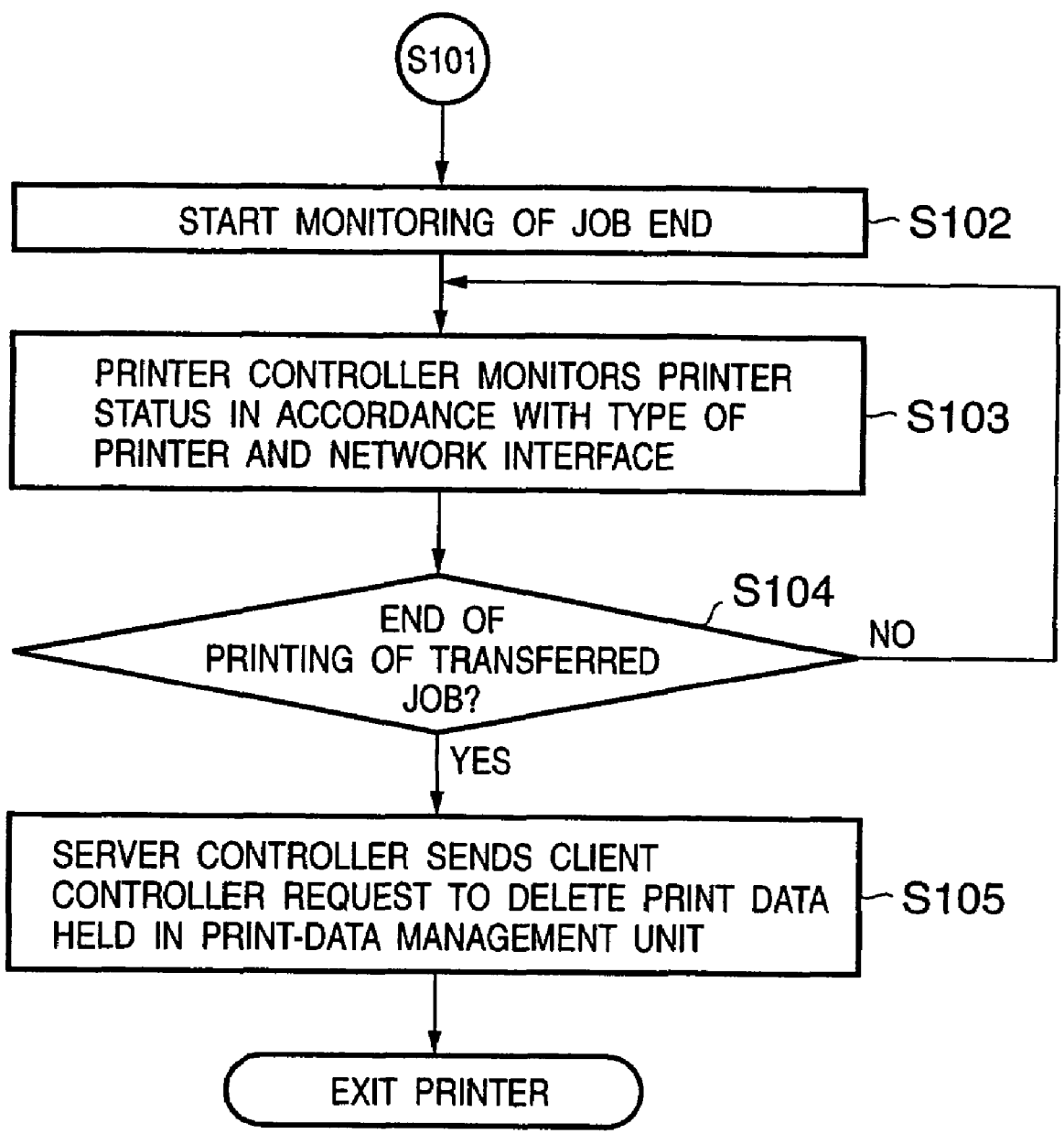
FIG. 10 is a flowchart illustrating processing, which follows that of FIG. 9, for printing from an application.

FIGS. 8 to 10 are flowcharts illustrating processing for printing from an application. This processing will be described in detail with reference to these flowcharts.

FIG. 8 is a flowchart illustrating processing for printing from an application in the host computer shown in FIG. 1. First, at step S81, the printer driver 301 accepts a print request from the application 300. This is processing by which the application 300 applies print processing to a printer object in the operating system and the present print server, which has been set as the print destination of the printer object, receives print data through the operating system. Next, at step S82, printer-recognizable print data generated by the printer driver 301 on the basis of a drawing function received from the application 300 is transferred from the client controller 302 to the print-data management unit 307. Next, at step S83, the client controller 302 extracts the job information from the print data and registers job information in the server controller 309. As a result, a print request is inserted at the end of the print queue. The print-data management unit 307 waits at step S84 until the turn of the registered print job arrives. The server controller 309 takes acceptance times of print jobs and their priority into account and issues print-start permission successively to the client controller 302 of the host computer that transmitted the job information at the top of print queue.

FIG. 9 is a flowchart illustrating processing, which follows that of FIG. 8, for printing from an application in the host computer of FIG. 1. When the turn of a waiting print job arrives at step S92 in FIG. 9, the server controller 309 issues permission to start printing of the print job to the print-job management unit 308, whereby printing starts. A print-job identifier, which is one example of job information for keeping track of a print job, is acquired by the print-job management unit 308 from the server controller 309 at step S93. It should be noted that the identifier is transferred to the printer and is used in order that the printer may identify the end of printing of the print job. Next, at step S94, the client controller 302 acquires the configuration information of the print-destination printer from the printer-information management unit 305. Then, at step S95, the print-job management unit 308 discriminates the type of control instruction from the type of printer and type of network interface, etc., and creates a control instruction that specifies a print-job identifier reported when printing of the job ends or a control instruction that specifies that a print-job identifier be set in an MIB in such a manner that it will be possible to receive the identifier of a job, whose printing has ended, using SNMP.

Next, at step S96, the print-job management unit 308 analyzes the print data. Then, at step S97, the print-job management unit 308 determines, from the result of step S96, whether a control instruction of the same type as that created at step S95 has been embedded in the print data. This determination is necessary because modules such as print servers that operate independently of the present print server embed similar control instructions. If the above-mentioned control instruction has been embedded, control proceeds to step S98, where the embedded control instruction is changed (instruction add-on/revision means) and the control instruction created at step S95 is embedded. If the above-mentioned control instruction has not been embedded, control proceeds to step S99, where the control instruction created at step S95 is added on as by being embedded (instruction add-on/revision means). Next, at step S910, print data is transferred to the printer via the communication unit 303 (network interface). At this time the network address of the printer is designated and the print data is transferred using a protocol such as LPR.

FIG. 10 is a flowchart illustrating processing, which follows that of FIG. 9, for printing from an application. Monitoring of end of printing is started at step S102 and the printer controller of the print server performs monitoring and management of printer status conforming to the model of the printer that is the object of monitoring or management and the type of network interface at step S103. More specifically, in a case where the printer of interest has a function for notifying of change of status or completion of printing (printing-completion notification means), the printer controller monitors the status of print processing by the printer by receiving the status-change or printing-end notification issued from the printer. If the printer of interest does not have the above-mentioned function, the printer controller performs monitoring and management of the status of print processing by the printer by polling printer status/printing-end job information using SNMP. The status of print processing refers to a state in which processing for printing a certain print job has been completed, a state in which operation has ended abnormally because a certain print job has developed an error, or a state in which printing of a certain print job is currently in progress. It is determined at step S104 whether printing of a print job that has been transferred to the printer has ended. If printing has not ended, control returns to step S103 so that the above-described monitoring and management of printer status are repeated. If printing has ended, however, control proceeds to step S105. Here the server controller transmits a request to delete print-job data to the print-job management unit 308, which proceeds to delete the retained print data and to terminate print processing.

Thus, the processing of FIGS. 8 to 10 described above decides a printer control method automatically based upon printer configuration information acquired by printer search processing, and makes it possible execute print processing, printing-end verification processing and processing for monitoring and managing printer status.

FIG. 11 shows an example of a control instruction, which is embedded by the processing of FIG. 9, embedded in print data in the host computer. In FIG. 11, 1101 sets it so that the beginning and end of a print job are reported to the host computer 102; 1102 sets the name of a job reported from the printer at the start of the print job; and 1103 sets the name of the job reported from the printer at the end of the print job. By arranging it so that the names set at 1102, 1103 are unique for the entire printing system or for every printer, it is possible to judge, from the job name reported by a printer, which job managed by the printing system has been completed.

Figure 12:
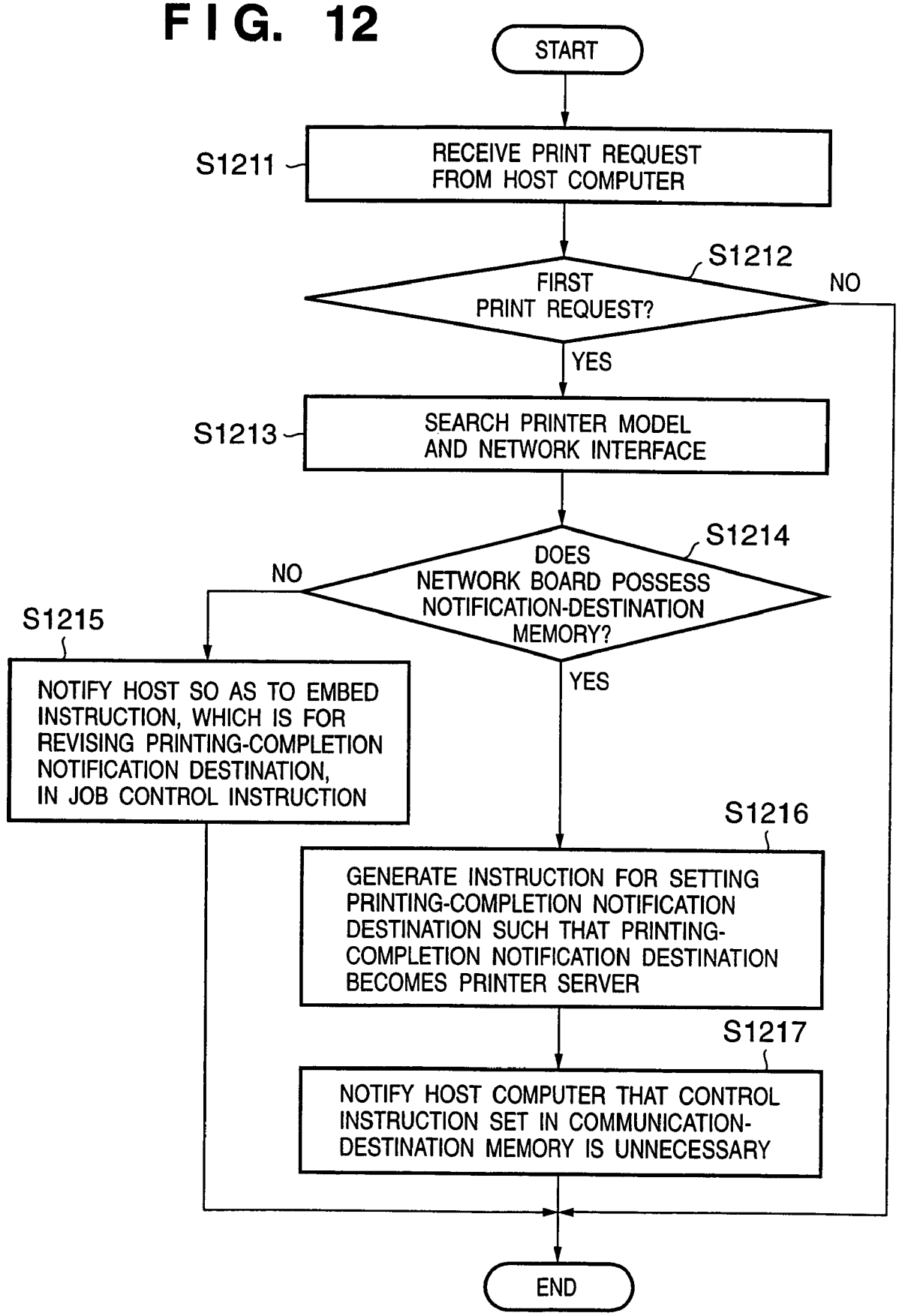
FIG. 12 is a diagram illustrating an example of a modification of processing, which is shown in FIG. 9, for setting and transmitting notification of completion of printing in a printer on the side of the print server.
Figure 13:
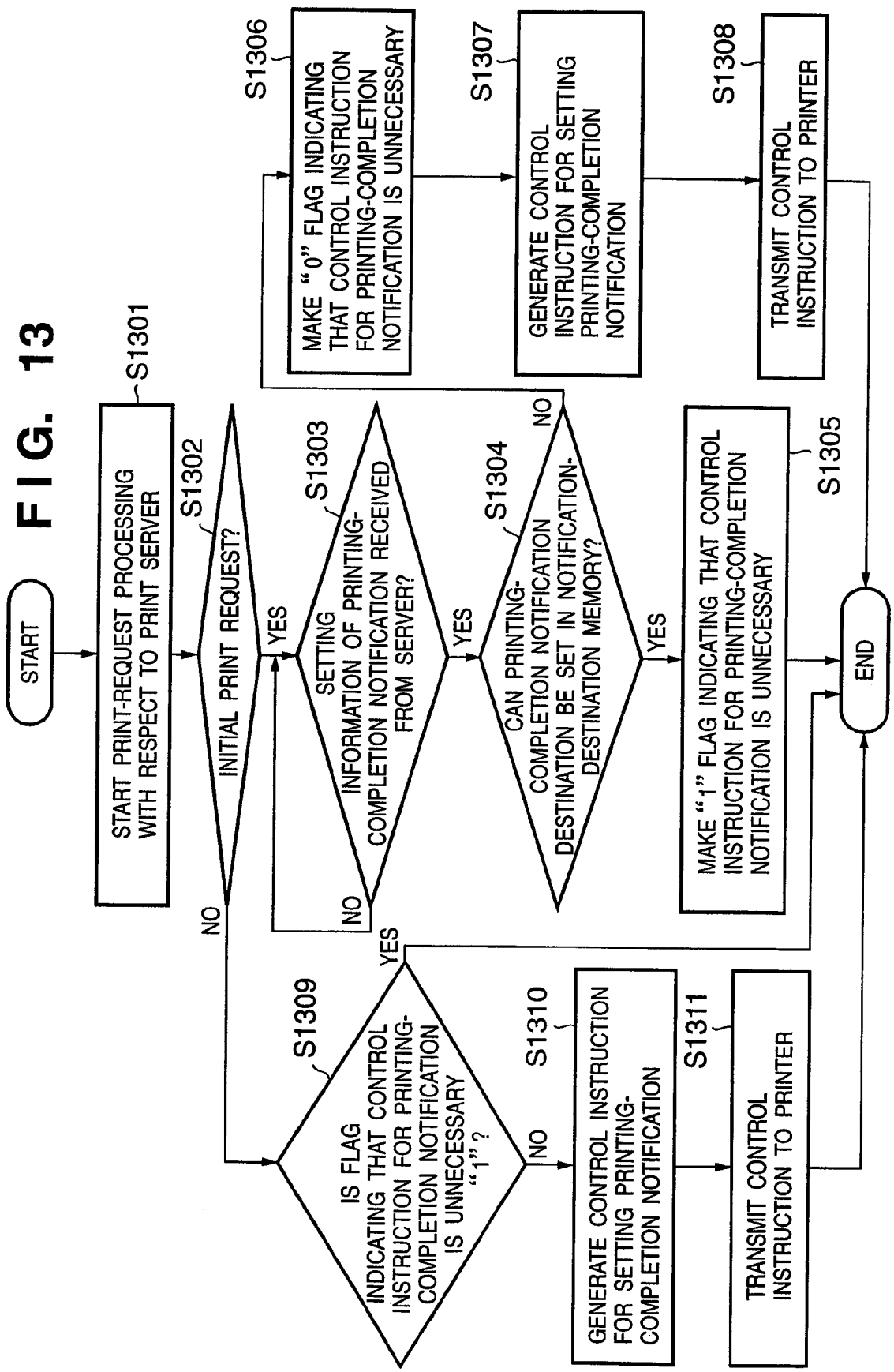
FIG. 13 is a diagram illustrating a method by which the host computer receives notification of completion of printing from a printer.

FIG. 12 is a diagram illustrating an example of a modification of processing, which is shown in FIG. 9, for setting and transmitting notification of completion of printing in a printer on the side of the print server. FIG. 13 is a diagram illustrating a method by which the host computer receives notification of completion of printing from a printer. This corresponds to the processing of FIG. 12. In FIG. 10, the status of print processing of a print server is monitored and managed depending upon whether or not a printer has a printing-completion notification function. Described below is an embodiment in which the method whereby the print server ascertains notification of completion of printing is changed depending upon whether or not storage means is provided for storing the destination notified of completion of printing.

Processing on the side of the print server will be described with reference to FIG. 12. Processing begins in response to receipt of a print request from a host computer. First, at step S1211, the print server receives from the host computer the print request to the printer specified by the host computer. Next, at step S1212, the server controller 309 in the print server determines whether the above-mentioned print request is the first print request to the specified printer. Next, at step S1213, the search unit 304 searches for information on the model of the printer requested to print and information on the network interface. Then, at step S1214, the server controller 309 determines whether the printer or the network board possessed by the printer is of the type having a memory that retains the destination to be notified of completion of printing (this memory shall be referred to as a "notification-destination memory" below). If the determination made by the server controller 309 of the print server at step S1214 is that the printer that is the destination of the output is of the type having the notification destination memory, then, at step S1216, the server controller 309 generates an instruction to set the printing-completion notification destination in the printer controller 306 in such a manner that the destination to be notified of completion of printing by the printer will be the print server, and transmits this instruction to the image forming apparatus to set the same. This is followed by step S1217, at which the server controller 309 notifies the client controller 302 of the host computer 102 of the fact that the control instruction relating to the printing-completion notification destination is unnecessary. This is because the printing-completion notification destination has been set normally in the notification-destination memory. If the decision by the print server at step S1214 is that the printer that is the destination of the output is of the type that does not possess the notification-destination memory, control proceeds to step S1215. Here an instruction for revising the printing-completion notification destination is reported from the print server to the host computer 102 in such a manner that this instruction will be embedded in the job control instruction in the next and subsequent printing operations.

FIG. 13 is a diagram illustrating a method by which the host computer receives notification of completion of printing from a printer in the processing shown in FIG. 12. Processing by the host computer corresponding to the print server will be described with reference to FIG. 13. Processing begins in response to issuance of a print request in the host computer. First, at step S1301, a print request to the print server is issued to the print server on the basis of an instruction from the application 300 in the host computer 102. The server controller 309 of the host computer determines at step S1302 whether this request is the initial print request. Thereafter, the host computer waits for receipt of setting information of printing-completion notification from the print server (step S1303). When the host computer accepts notification of the setting information of printing-completion notification from the print server at step S1215, control proceeds to step S1304 Here it is determined whether the printer has the notification-destination memory and whether the printing-completion notification destination can be set in the notification-destination memory. If the printer management unit determines that the printer has the notification-destination memory and that the printing-completion notification destination cannot be set in the notification-destination memory, then a flag indicating that the control instruction for printing-completion notification is unnecessary is set to "0" at step S1306 when the print request is issued. A control instruction for setting notification of completion of printing is generated and transmitted at steps S1307 and S1308. If it is determined that the printing-completion notification destination can be set in the notification-destination memory, then a flag indicating that the control instruction for printing-completion notification is unnecessary is set to "1" at step S1305 and processing is exited. If it is determined at step S1302 that the print request has been issued to the same printer two or more times, then it is determined at step S1309 whether the flag indicating that the control instruction for printing-completion notification is unnecessary is "1". If the flag is "1", processing is exited. If the flag is "0", a control instruction for setting notification of completion of printing is generated at step S1310 and this control instruction is transmitted to the print server at step S1311.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the embodiment and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile memory card or ROM, etc.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Thus, in accordance with the preferred embodiment of the present invention as described above, the following effects are obtained. When a printer server is set, the network addresses, model names and network board names of printers on a network are searched and printers are set automatically, thereby making it possible to prevent the occurrence of input errors when information such as network addresses are entered. It is not necessary for the user to know detailed information for the purpose of setting printers, and therefore printing settings can be made easily. Troublesome printing settings can be eliminated by automating printing settings with regard to a plurality of modules. A printer control method can be changed over automatically based upon printer configuration information.

As many apparently widely different embodiments of the present invention can be made without departing from the spirit and scope thereof, it is to be understood that the invention is not limited to the specific embodiments thereof except as defined in the appended claims.

What is claimed is:

1. A printing control apparatus that communicates with an image forming apparatus connected via a network, comprising:
    determination means for determining whether the image forming apparatus has a printing-completion notification function; and
    management means for managing status of print processing by receiving notification of completion of printing, which is transmitted by the image forming apparatus, if said determination means has determined that the image forming apparatus has the printing-completion notification function, and by requesting and receiving status of print processing from the image forming apparatus if said determination means has determined that the image forming apparatus does not have the printing-completion notification function.

2. The apparatus according to claim 1, wherein said determination means determines whether the image forming apparatus has the printing-completion notification function based upon information, which is received from the image forming apparatus, indicative of the printing-completion notification function possessed by the image forming apparatus.

3. The apparatus according to claim 1, wherein sequence management of a print request that enters from an information processing apparatus via a network interface is performed.

4. The apparatus according to claim 1, wherein the status of print processing is managed using job information.

5. A printing control method used in a printing control apparatus that communicates with an image forming apparatus, comprising:
    a determination step of determining whether the image forming apparatus has a printing-completion notification function; and
    a management step of managing status of print processing by receiving notification of completion of printing, which is transmitted by the image forming apparatus, if said determination step has determined that the image forming apparatus has the printing-completion notification function, and by requesting and receiving status of print processing from the image forming apparatus if said determination step has determined that the image forming apparatus does not have the printing-completion notification function.

6. The method according to claim 5, wherein said determination step determines whether the image forming apparatus has the printing-completion notification function based upon information, which is received from the image forming apparatus, indicative of the printing-completion notification function possessed by the image forming apparatus.

7. The method according to claim 5, wherein sequence management of a print request that enters from an information processing apparatus via a network interface is performed.

8. The method according to claim 1, wherein the status of print processing is managed using job information.

9. A control program executed in a printing control apparatus that communicates with an image forming apparatus via a network, comprising:

a determination step of determining whether the image forming apparatus has a printing-completion notification function; and a management step of managing status of print processing by receiving notification of completion of printing, which is transmitted by the image forming apparatus, if said determination step has determined that the image forming apparatus has the printing-completion notification function, and by requesting and receiving status of print processing from the image forming apparatus if said determination step has determined that the image forming apparatus does not have the printing-completion notification function.

10. The control program according to claim 9, wherein at said determination step, the printing control apparatus is caused to execute the step of determining whether the image forming apparatus has the printing-completion notification function based upon information, which is received from the image forming apparatus, indicative of the printing-completion notification function possessed by the image forming apparatus.

11. The control program according to claim 9, wherein the printing control apparatus is caused to perform sequence management of a print request that enters from an information processing apparatus via a network interface.

12. The control program according to claim 9, wherein the printing control apparatus is caused to manage status of print processing using job information.

13. A printing system which includes an information processing apparatus, an image forming apparatus and a printing control apparatus connected via a network, said printing control apparatus comprising:

determination means for determining whether the image forming apparatus has a printing-completion notification function;

management means for managing status of print processing of said image forming apparatus in response to notification of completion of printing transmitted by said image forming apparatus if said determination means has determined that said image forming apparatus has the printing-completion notification function, and managing status of print processing by said image forming apparatus if said determination means has determined that said image forming apparatus does not have the printing-completion notification function; and management-result notification means for notifying said information processing apparatus of result of management by said management means;

said information processing apparatus transmitting print data to said image forming apparatus on the basis of result of management of which notification has been given by said printing control apparatus.

* * * * *